United States Patent
Boot (10) Patent No.: US 8,686,686 B2
(45) Date of Patent: Apr. 1, 2014

(54) SYSTEM AND METHOD FOR USE IN CHARGING AN ELECTRICALLY POWERED VEHICLE

(75) Inventor: John Christopher Boot, Sandy Springs, GA (US)

(73) Assignee: General Electric Company, Schenectady, NY (US)

( * ) Notice: Subject to any disclaimer, the term of this patent is extended or adjusted under 35 U.S.C. 154(b) by 305 days.

(21) Appl. No.: 13/178,264

(22) Filed: Jul. 7, 2011

(65) Prior Publication Data
US 2013/0009597 A1   Jan. 10, 2013

(51) Int. Cl.
*H02J 7/00* (2006.01)

(52) U.S. Cl.
USPC .......................................... 320/109; 320/115

(58) Field of Classification Search
USPC .................................................. 320/109, 115
See application file for complete search history.

(56) References Cited

U.S. PATENT DOCUMENTS

| | | |
|---|---|---|
| 2004/0098179 A1 | 5/2004 | Sokoloski et al. |
| 2009/0251300 A1 * | 10/2009 | Yasuda et al. ............... 340/426.1 |
| 2009/0278492 A1 | 11/2009 | Shimizu et al. |
| 2010/0010698 A1 | 1/2010 | Iwashita et al. |
| 2010/0241542 A1 | 9/2010 | Pinkusevich et al. |
| 2010/0274570 A1 | 10/2010 | Proefke et al. |

FOREIGN PATENT DOCUMENTS

| | | |
|---|---|---|
| CA | 2648972 A1 | 6/2009 |
| EP | 1067498 A1 | 1/2001 |
| EP | 1995109 A1 | 11/2008 |

OTHER PUBLICATIONS

Search Report and Written Opinion from corresponding PCT Application No. PCT/US2012/045347 dated Jan. 8, 2013.

* cited by examiner

*Primary Examiner* — Samuel Berhanu
(74) *Attorney, Agent, or Firm* — General Electric Company (57) ABSTRACT

A method of delivering power from a power supply to an electric vehicle is described herein. The method includes receiving, by a charging station from the electric vehicle, a request to deliver power from the power supply to the electric vehicle. A signal that is indicative of a unique identifier associated with the electric vehicle is received, and the charging station determines whether the unique vehicle identifier is associated with a stolen electric vehicle, and delivers power, from the charging device to the electric vehicle, after determining the unique identifier is not associated with a stolen electric vehicle.

20 Claims, 3 Drawing Sheets

SYSTEM AND METHOD FOR USE IN CHARGING AN ELECTRICALLY POWERED VEHICLE

BACKGROUND OF THE INVENTION

The subject matter disclosed herein relates generally to electrically powered vehicles and, more specifically, to systems and methods for use in charging an electrically powered vehicle.

Electrically powered vehicles, including electric vehicles and plug-in hybrid electric vehicles, include electric motors powered by energy storage devices, such as batteries. An energy storage device is depleted of energy as the motor is operated, requiring the operator of the vehicle to recharge the energy storage device. As the number of electric vehicles in use increases, the amount of electric vehicles that are stolen may also increase.

At least some known vehicle charging devices are designed to charge the energy storage device when connected to the vehicle, without requiring authentication or authorization of the user. As such, known charging devices will deliver power to an electric vehicle regardless of whether the vehicle has been reported as stolen. At least some known charging devices may be unsuitable for use in a publicly accessible location, because these charging devices do not require authentication of vehicle ownership prior to delivering power. Moreover, other charging devices may require specialized equipment to identify and/or authenticate the user, imposing additional materials costs and the inconvenience of maintaining possession of the specialized equipment.

Accordingly, it is desirable to provide a system and method capable of authenticating ownership of the electric vehicle before delivering power to the electric vehicle.

BRIEF DESCRIPTION OF THE INVENTION

In one aspect, a method of delivering power from a power supply to an electric vehicle is provided. The method includes receiving, by a charging station from the electric vehicle, a request to deliver power from the power supply to the electric vehicle. A signal that is indicative of a unique identifier associated with the electric vehicle is received, and the charging station determines whether the unique vehicle identifier is associated with a stolen electric vehicle, and delivers power, from the charging device to the electric vehicle, after determining the unique identifier is not associated with a stolen electric vehicle.

In another aspect, a charging device for use in delivering power from a power supply to an electric vehicle is provided. The charging device includes a power delivery assembly that is coupled to the power supply to selectively deliver power from the power supply to the electric vehicle. A controller is coupled to the power delivery assembly and is configured to receive a request to deliver power from the power supply to the electric vehicle. The controller receives, from the electric vehicle, a signal that is indicative of a unique identifier associated with the electric vehicle. The controller determines whether the unique vehicle identifier is associated with a stolen electric vehicle, and delivers power, from the charging device to the electric vehicle, after determining the unique identifier is not associated with a stolen electric vehicle.

In yet another aspect, a power delivery system for use in charging an electric vehicle is provided. The power delivery system includes a charging device and an authentication device that is coupled to the charging device. The charging device is configured to be electrically coupled to an electric vehicle for delivering power between a power supply and the electric vehicle. The charging device is configured to receive a request to deliver power from the power supply to the electric vehicle. The charging device receives from the electric vehicle, a signal that is indicative of a unique identifier associated with the electric vehicle. The authentication device is configured to receive, from the charging station, a stolen vehicle verification request including the unique vehicle identifier. The authentication device determines whether the unique identifier is included in a collection of unique identifiers contained in a stolen electric vehicle program. The authentication device transmits, to the charging station, a stolen vehicle verification message indicating the electric vehicle is a stolen electric vehicle upon determining the unique vehicle identifier is included in the collection of unique vehicle identifiers contained in a stolen electric vehicle program.

DETAILED DESCRIPTION OF THE INVENTION

The exemplary methods and systems described herein overcome at least some disadvantages of known electrical charging devices by selectively delivering power to an electric vehicle based on whether the electric vehicle has been reported as stolen. Moreover, the power delivery system described herein includes an authentication device that requests a unique vehicle identifier from the electric vehicle, and determines whether the electric vehicle is stolen based at least in part on the unique vehicle identifier. In addition, after determining the electric vehicle to be stolen, the charging device will notify a law enforcement agency of the time and location at which the charging device received a request to deliver power from the stolen electric vehicle. Moreover, the charging device may discharge power from the electric vehicle to disable the electric vehicle. By providing a charging device that determines whether an electric vehicle is stolen and notifies a law enforcement agency of the location of the stolen electric vehicle, the potential to undesirably deliver power to a stolen vehicle is reduced. As such, the cost of maintaining and/or replacing the electric vehicle is reduced.

In some embodiments, the term "electrically powered vehicle" refers generally to a vehicle that includes one or more electric motors that are used for propulsion. Energy used to propel electrically powered vehicles may come from various energy storage devices, such as, but not limited to, an on-board rechargeable battery, a capacitor, and/or an on-board fuel cell. In one embodiment, the electrically powered vehicle is a hybrid electric vehicle, which may include both an electric motor and a combustion engine. In another embodiment, an electrically powered vehicle is an electric vehicle, which may include only an electric motor for propulsion. Moreover, some electrically powered vehicles are capable of recharging the energy storage device from a power receptacle, such as a power outlet. Accordingly, the term "electrically powered vehicle" as used herein may refer to any vehicle that includes an energy storage device to which electrical energy may be delivered, for example, via a power grid.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

Although described in connection with an exemplary parking and/or metering system environment, embodiments of the invention are operational with numerous other general purpose or special purpose computing system environments or configurations. The system environment is not intended to suggest any limitation as to the scope of use or functionality of any aspect of the invention. Moreover, the system environment should not be interpreted as having any dependency or requirement relating to any one or combination of components illustrated in the exemplary operating environment. Examples of well known systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more controllers, computers, or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

An exemplary technical effect of the methods, systems, and computers described herein includes at least one of (a) receiving, by a charging station from the electric vehicle, a request to deliver power from the power supply to the electric vehicle; (b) receiving, by the charging station from the electric vehicle, a signal that is indicative of a unique identifier associated with the electric vehicle; (c) determining, by the charging station, whether the unique vehicle identifier is associated with a stolen electric vehicle; (d) delivering power, from the charging device to the electric vehicle, after determining the unique identifier is not associated with a stolen electric vehicle.

Figure 1:
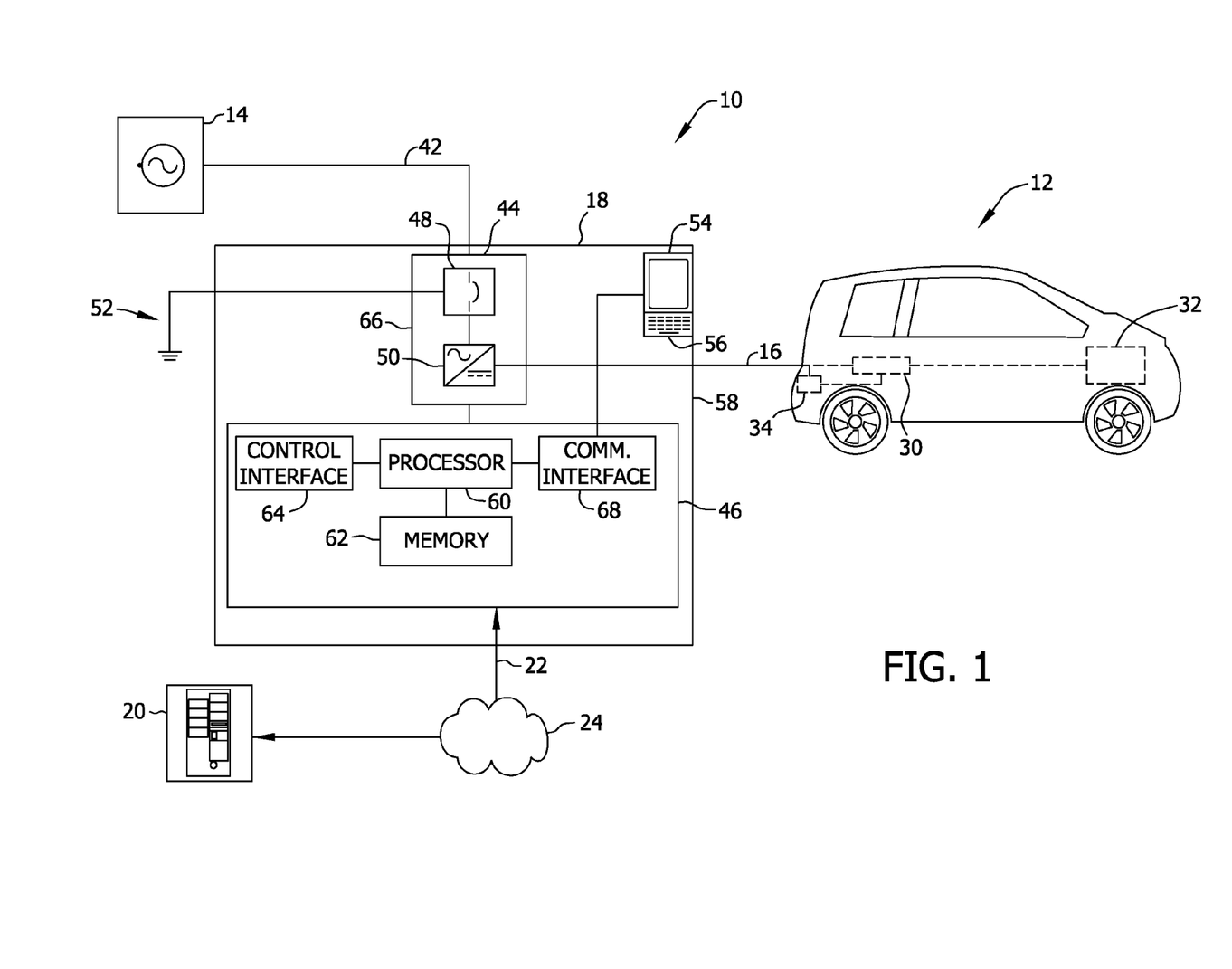
FIG. 1 is a block diagram of an exemplary power delivery system for use in charging an electric vehicle.
Figure 2:
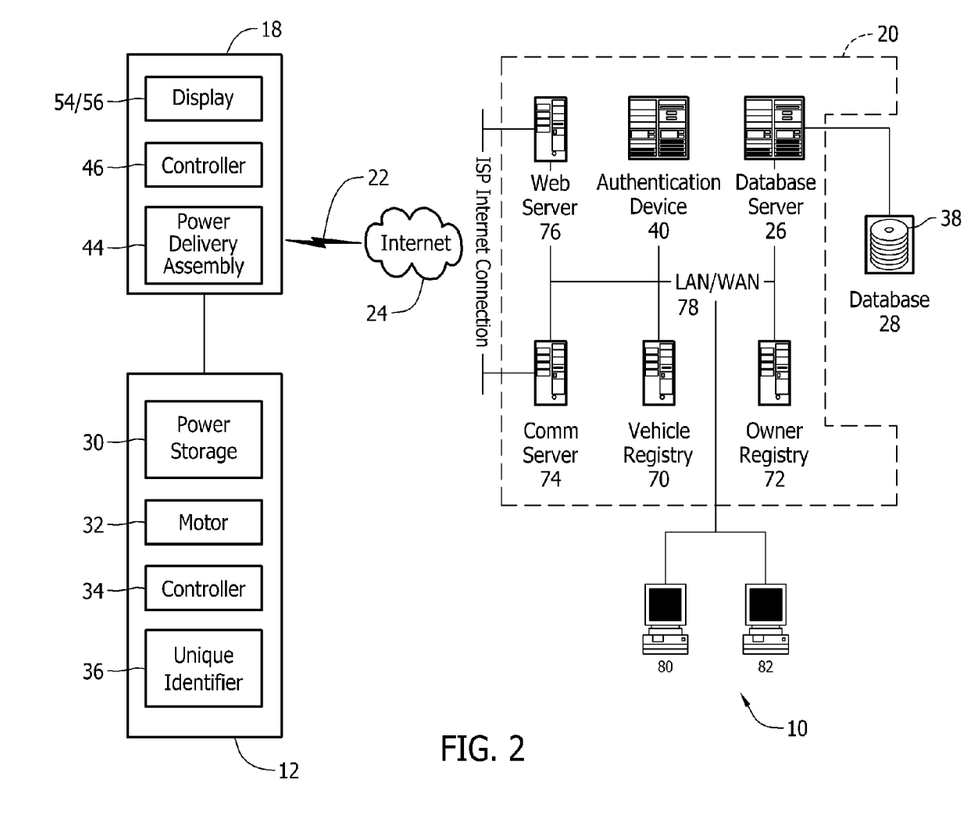
FIG. 2 is an expanded block diagram of the power delivery system shown in FIG. 1.

FIG. 1 is a block diagram of an exemplary power delivery system 10 for use in charging, or providing electricity to, at least one rechargeable electrical load, such as an electric vehicle 12. FIG. 2 is an expanded block diagram of power delivery system 10. In the exemplary embodiment, power delivery system 10 includes an electric power source 14, a power delivery conduit 16 that is coupled to electric vehicle 12, one or more a charging devices 18, and a server system 20. Each charging device 18 is electrically coupled between power delivery conduit 16 and electric power source 14 to selectively deliver electrical power from electric power source 14 to electric vehicle 12 through power delivery conduit 16. Server system 20 is coupled to each charging device 18 via a network link 22 that enables each charging device 18 to access server system 20 over a network 24, such as the Internet and/or an intranet.

Charging devices 18 are interconnected to the Internet through many interfaces including a network, such as a local area network (LAN), a wide area network (WAN), dial-in-connections, cable modems, wireless modems, and/or special high-speed Integrated Services Digital Network (ISDN) lines. A database server 26 is connected to a database 28 containing information on a variety of matters, such as for example account information related to electric vehicle 12, owner information of electric vehicle 12, a stolen electric vehicle program, and/or an electric vehicle energy distribution. In one embodiment, centralized database 28 is stored on server system 20 and is accessed directly via at least one charging device 18. In an alternative embodiment, database 28 is stored remotely from server system 20 and may be non-centralized.

Electric vehicle 12 includes at least one power storage device 30, such as a battery and/or any other electrical storage device, coupled to a motor 32. Electric vehicle 12 also includes a vehicle controller 34 operatively coupled to power storage device 30. Charging device 18 is removably coupled to power storage device 30 and to vehicle controller 34 with power delivery conduit 16. Alternatively, charging device 18 may be coupled to vehicle controller 34 by a wireless data link (not shown). In the exemplary embodiment, power delivery conduit 16 includes at least one conductor (not shown) for supplying electricity to power storage device 30, and at least one conductor (not shown) for transmitting data to, and receiving data from, vehicle controller 34. Alternatively, power delivery conduit 16 may include a single conductor that transmits and/or receives power and/or data, or any other number of conductors that enables power delivery system 10 to function as described herein. In the exemplary embodiment, vehicle controller 34 operates power storage device 30 to receive power from charging device 18 and is configured to selectively disable power storage device 30. In addition, vehicle controller 34 may disable power storage device 30 such that power storage device 30 is unable to receive electrical power from charging device 18. Moreover, vehicle controller 34 may operate power storage device 30 to discharge power to charging device 18 to facilitate disabling electric vehicle 12 and/or power storage device 30. In one embodiment, vehicle controller 34 disconnects power storage device 30 from motor 32 to prevent an operation of electric vehicle 12.

Each power storage device 30 includes a unique vehicle identifier 36 that is used by charging device 18 and/or server system 20 to identify electric vehicle 12, identify power storage device 30, and/or identify an owner of electric vehicle 12. For example, database 28 may include a listing of electric vehicles 12 and/or power storage devices 30 that have been reported as stolen. Moreover, database 28 may include a collection of unique vehicle identifiers 36 contained in a stolen vehicle program 38. Further, database 28 may include electric vehicle owner information, such as owner account information and owner contact information.

In the exemplary embodiment, server system 20 includes an authentication device 40 that is coupled to database 28 to authenticate an ownership of power storage device 30 and/or electric vehicle 12 based at least partially on unique vehicle identifier 36. In the exemplary embodiment, a user connects power storage device 30 to charging device 18 with power delivery conduit 16 and requests a power delivery from charging device 18 to electric vehicle 12. Charging device 18 requests a unique vehicle identifier 36 from electric vehicle controller 34 to authenticate ownership of electric vehicle 12. Charging device 18 receives unique vehicle identifier 36 from electric vehicle 12 and transmits a request to authentication device 40, including unique vehicle identifier 36, to authenticate ownership of electric vehicle 12. Authentication device 40 determines whether unique vehicle identifier 36 is included in a collection of unique identifiers contained in stolen vehicle program 38 and determines electric vehicle 12 and/or power storage device 30 to be a stolen vehicle if unique vehicle identifier 36 is contained in stolen vehicle program 38. Authentication device 40 transmits a signal to charging device 18 indicative of whether electric vehicle 12 is a stolen vehicle, and charging device 18 delivers power to electric vehicle 12 based on the received signal. Moreover, charging device 18 delivers power to electric vehicle 12 after determining unique vehicle identifier 36 is not contained within stolen vehicle program 38.

In the exemplary embodiment, electric power source 14 is, for example, a generator, a battery, and/or any other device or system that provides electricity to charging device 18. Charging device 18 is electrically coupled to electric power source 14 with an electrical distribution bus 42. Electrical distribution bus 42 is a three-phase bus, such as a portion of an electric power grid of a utility company, providing alternating current (AC) power (i.e., AC current and voltage) to charging device 18. Alternatively, electrical distribution bus 42 may include any number of phases of AC power to charging device 18.

In the exemplary embodiment, charging device 18 includes a power delivery assembly 44 and a controller 46 coupled in operative communication with power delivery assembly 44. Power delivery assembly 44 includes a protection device 48 and a power conditioning device 50. Protection device 48 is coupled between power source 14 and power conditioning device 50 to selectively electrically isolate and/or disconnect power conditioning device 50 from electrical distribution bus 42. In the exemplary embodiment, protection device 48 is electrically coupled to electric vehicle 12 via power delivery conduit 16. In addition, protection device 48 is electrically coupled to ground 52 for discharging electrical power from electric vehicle 12 to ground 52. Controller 46 may operate protection device 48 to discharge power from power storage device 30 to ground 52 to disable electric vehicle and/or power storage device 30. Alternatively, protection device 48 may discharge power from power storage device 30 into power source 14 to drain power storage device 30 of electric power to prevent power storage device 30 and/or electric vehicle 12 from operating. Protection device 48, in the exemplary embodiment, includes a circuit breaker (not shown). Alternatively, protection device 48 may include a fuse, a relay, and/or any other device that enables protection device 48 to function as described herein.

In the exemplary embodiment, power conditioning device 50 is coupled between power protection device 48 and vehicle power storage device 30 to selectively deliver power from power source 14 to vehicle power storage device 30. Controller 46 operates power delivery assembly 44 to selectively deliver electrical power from electric power source 14 to electric vehicle 12. Power conditioning device 50 adjusts at least one characteristic of the volt-amperes received from electric power source 14 and converts the AC volt-amperes received from electric power source 14 to DC power for use in charging vehicle power storage device 30. In the exemplary embodiment, controller 46 receives a direct current (DC) charging request from vehicle controller 34 representative of a demanded charging current for use in charging power storage device 30 (hereinafter referred to as a "DC demand"). Controller 46 determines a commanded DC current (hereinafter referred to as a "DC command") based on the DC demand and transmits data representative of the DC command to power delivery assembly 44.

Controller 46 operates power conditioning device 50 to convert AC volt-amperes received from electric power source 14 to DC power based at least in part on the DC command, and to deliver the converted DC power to vehicle power storage device 30 through power delivery conduit 16 to electrically charge vehicle power storage device 30. In one embodiment, power conditioning device 50 may receive, from controller 46, varying DC command levels during charging, as power storage device 30 reaches a full charge.

In the exemplary embodiment, charging device 18 includes a display 54 and a user interface 56 that are each coupled to controller 46. Display 54 and/or user interface 56 may be coupled to an outer surface 58 of charging device 18, or may be positioned at any suitable location such that display 54 and user interface 56 are accessible to a user. Display 54, in the exemplary embodiment, includes a vacuum fluorescent display (VFD) and/or one or more light-emitting diodes (LED). Additionally or alternatively, display 54 may include, without limitation, a liquid crystal display (LCD), a cathode ray tube (CRT), a plasma display, and/or any suitable visual output device capable of displaying graphical data and/or text to a user. In an exemplary embodiment, a charging request, a charging level, a unit financial cost of electrical power, an accumulated electrical power financial cost incurred during charging, and/or any other information may be displayed to a user on display 54. User interface 56 includes, without limitation, a keyboard, a keypad, a touch-sensitive screen, a scroll wheel, a pointing device, a barcode reader, a magnetic card reader, a radio frequency identification (RFID) card reader, an audio input device employing speech-recognition software, and/or any suitable device that enables a user to input data into controller 46 and/or to retrieve data from controller 46. In the exemplary embodiment, the user may input a predefined amount of electrical power demand and/or a predefined financial amount for use in charging power storage device 30 using user interface 56. Moreover, the user may operate user interface 56 to initiate and/or terminate an operation of charging device 18.

In the exemplary embodiment, controller 46 includes a processor 60 and a memory device 62. The above examples are exemplary only, and thus are not intended to limit in any way the definition and/or meaning of the term "processor." Memory device 62 includes a computer readable medium, such as, without limitation, random access memory (RAM), flash memory, a hard disk drive, a solid state drive, a diskette, a flash drive, a compact disc, a digital video disc, and/or any suitable device that enables processor 60 to store, retrieve, and/or execute instructions and/or data.

In the exemplary embodiment, controller 46 includes a control interface 64 that controls an operation of charging device 18. Control interface 64 is coupled to one or more control devices 66, such as, for example, protection device 48 and/or power conditioning device 50, respectively. In addition, controller 46 includes a communication interface 68 that is coupled to server system 20, display 54, and/or user interface 56 for transmitting signals to, and receiving signals from, server system 20, display 54, and/or user interface 56.

Various connections are available between control interface 64 and control device 66, and between processor 60 and server system 20, display 54 and/or user interface 56. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside charging device 18) network connection, whether wired or wireless.

In the exemplary embodiment, a user connects power storage device 30 to charging device 18 with power delivery conduit 16. The user may access user interface 56 to enter information, such as, for example, a power delivery request, an amount of demanded charging current, and/or payment information, to initiate power delivery from power source 14 to power storage device 30. Controller 46 receives a request from user interface 56 to deliver power, and requests unique vehicle identifier 36 from electric vehicle controller 34 to authenticate ownership of electric vehicle 12. Controller 46 receives unique vehicle identifier 36 from electric vehicle 12 and transmits a request to authentication device 40 to authenticate ownership of electric vehicle 12. Controller 46 determines whether unique vehicle identifier 36 is associated with a stolen electric vehicle, and operates power conditioning device 50 to deliver power from power source 14 to electric vehicle 12 after determining that electric vehicle 12 is not a stolen electric vehicle.

In the exemplary embodiment, after determining that electric vehicle 12 is not a stolen vehicle, charging device 18 receives power from electric power source 14 and provides the power to power storage device 30 through power delivery conduit 16. Controller 46 communicates with vehicle controller 34 wirelessly, through power delivery conduit 16, and/or through any other conduit, to control and/or to monitor the delivery of power to power storage device 30. For example, vehicle controller 34 may transmit signals to controller 46 indicating a charge level of power storage device 30 and/or a desired amount and/or rate of power to be provided by charging device 18. Charging device controller 46 may transmit signals to vehicle controller 34 indicating an amount and/or rate of electricity being delivered to power storage device 30. When power storage device 30 has been charged to a desired level, charging device 18 ceases delivering power to power storage device 30 and the user disengages power delivery conduit 16 from power storage device 30.

If controller 46 determines electric vehicle 12 to be a stolen vehicle, controller 46 does not initiate a power delivery to electric vehicle 12. In addition, controller 46 may transmit a notification signal to server system 20 that is indicative of a location of charging device 18 and a time at which charging device 18 received a request for power delivery from electric vehicle 12. Controller 46 may operate protection device 48 to discharge electrical power from power storage device 30 to ground 52 to disable power storage device 30 and/or electric vehicle 12. Additionally, controller 46 may operate protection device 48 to discharge electrical power from electric vehicle 12 to power source 14. In one embodiment, controller 46 may transmit a signal to vehicle controller 34 indicating electric vehicle 12 to be a stolen electric vehicle and vehicle controller 34 disconnects power storage device 30 from motor 32 to prevent an operation of electric vehicle 12.

In the exemplary embodiment, server system 20 includes database server 26, authentication device 40, a vehicle registry device 70, an owner registry device 72, a communication server 74, and a web server 76. Devices 40, 70, and 72, and servers 26, 74, and 76 are coupled in a local area network (LAN) 78. Moreover, a motor vehicle agency administrator workstation 80 and a law enforcement agency administrator workstation 82 are also coupled to LAN 78 to enable communication with server system 20. Alternatively, workstations 80 and 82 may be coupled to LAN 78 using an Internet link or may be coupled through an intranet.

In one embodiment, an owner or user of electric vehicle 12 may access server system 20 via web server 76 to access vehicle registry device 70 and/or owner registry device 72. Moreover, a law enforcement agency and/or a motor vehicle agency may access server system 20 via web server 76 to access vehicle registry device 70 and/or owner registry device 72.

In the exemplary embodiment, owner registry device 72 includes a collection of unique vehicle identifiers 36 and a collection of owner accounts that are each associated with a unique vehicle identifier 36. Vehicle registry device 70 includes a stolen vehicle program 38 that includes a collection of unique vehicle identifiers 36 that are associated with electric vehicles 12 that have been reported as stolen. In the exemplary embodiment, a user may access owner registry device 72 to create an ownership account including ownership contact information and to assign the created ownership account to an electric vehicle 12 and/or unique vehicle identifier 36. Moreover, a user may access vehicle registry device 70 to report an electric vehicle 12 as stolen and include a unique vehicle identifier 36 within the collection of unique vehicle identifiers 36 included in stolen vehicle program 38. In addition, a user may contact a law enforcement agency and/or a motor vehicle agency to report an electric vehicle as stolen. The law enforcement agency and/or the motor vehicle agency may also access vehicle registry device 70 to include unique vehicle identifier 36 in the collection of unique vehicle identifiers 36 to report electric vehicle 12 as stolen.

In the exemplary embodiment, upon receiving a request for power delivery from an electric vehicle 12, charging device 18 transmits a verification request to authentication device 40 to determine whether unique vehicle identifier 36 is associated with a stolen vehicle. Authentication device 40 transmits a stolen vehicle verification request to vehicle registry device 70 including unique vehicle identifier 36. Vehicle registry device 70 determines whether unique vehicle identifier 36 is contained within the stolen vehicle program 38, and transmits a verification signal to authentication device 40 indicative of whether electric vehicle 12 is a stolen electric vehicle. If electric vehicle 12 is determined to be stolen, authentication device 40 transmits an owner verification request to owner registry device 72 including unique vehicle identifier 36. Owner registry device 72 transmits a verification message including an owner account that is associated with unique vehicle identifier 36. Authentication device 40 transmits the owner account and the stolen vehicle verification request to charging device 18. Charging device 18 and/or authentication device 40 transmit a communication request to communication server 74 to deliver a notification message, such as an email message, a mobile text message, or any other wired and/or wireless communication message, to the owner indicating electric vehicle 12 has requested a power delivery at charging device 18. Charging device 18 and/or authentication device 40 may include a time of the power delivery request and a location of charging device 18. In addition, charging device 18 and/or authentication device 40 may transmit, via communication server 74, a message including unique vehicle identifier 36, a time of power delivery request, and a location of charging device 18 to motor vehicle agency administrator workstation 80 and a law enforcement agency administrator workstation 82.

Figure 3:
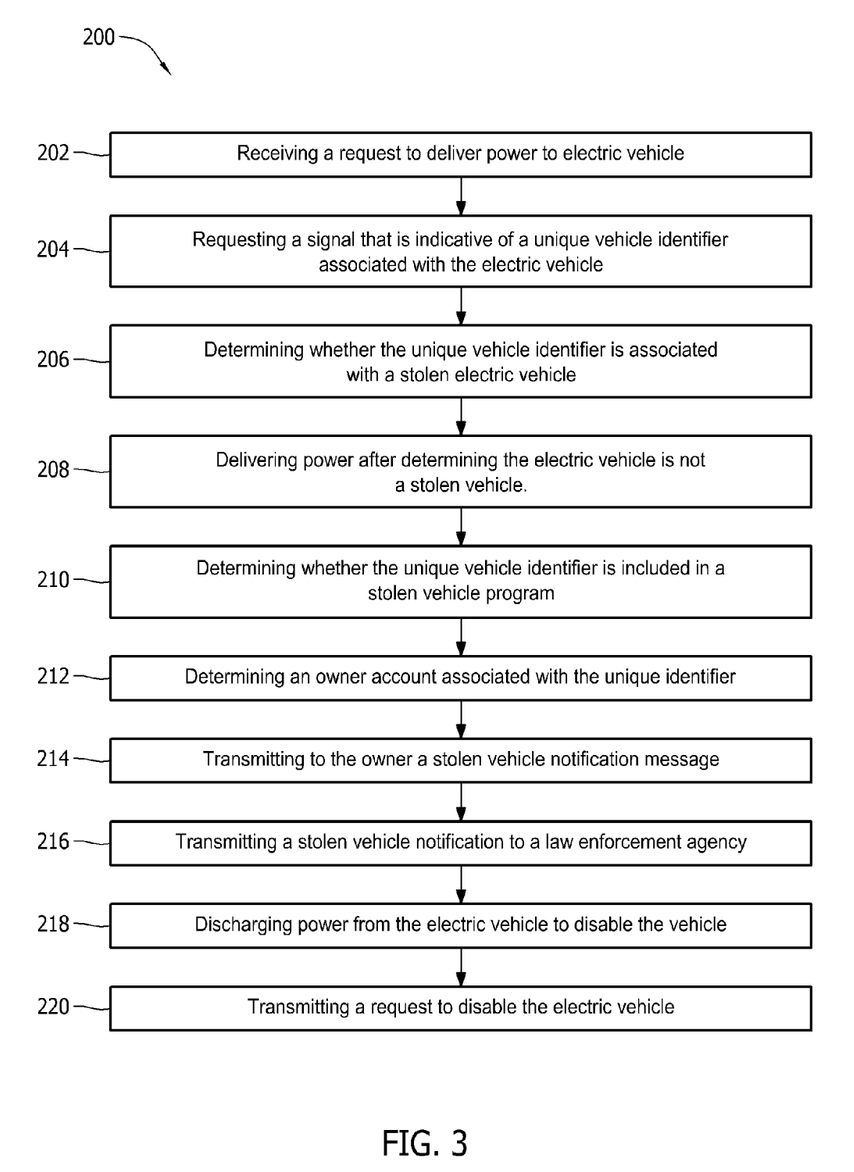
FIG. 3 is a flow diagram of an exemplary method of delivering power to an electric vehicle that may be used with the power delivery system shown in FIG. 1.

FIG. 3 is a flow chart of an exemplary method 200 that may be used to deliver power to electric vehicle 12. In the exemplary embodiment, method 200 includes receiving 202, by charging device 18 from electric vehicle 12, a request to deliver power from power source 14 to electric vehicle 12. Charging device 18 requests 204 a signal that is indicative of unique vehicle identifier 36 associated with electric vehicle 12. Charging device 18 determines 206 whether unique vehicle identifier 36 is associated with a stolen electric vehicle and delivers 208 power to electric vehicle 12 after determining 206 electric vehicle 12 is not a stolen electric vehicle. In addition, method 200 includes determining 210 whether unique vehicle identifier 36 is included in a collection of unique vehicle identifiers 36 contained in stolen vehicle program 38, and determines 206 electric vehicle 12 to be a stolen electric vehicle if unique vehicle identifier 36 is contained within stolen vehicle program 38. Method 200 also includes determining 212 an owner account associated with unique vehicle identifier 36 and transmitting 214, from charging device 18 to the owner, a stolen vehicle notification message after determining 206 electric vehicle 12 to be a stolen electric vehicle. The stolen vehicle notification signal may include one of a location of charging device 18 and a time at which the request to deliver power was received by charging device 18 from electric vehicle 12. In addition, method 200 includes transmitting 216 a stolen vehicle notification signal to a law enforcement agency after determining 206 electric vehicle 12 to be a stolen electric vehicle. In one embodiment, method 200 includes discharging 218 power from electric vehicle 12 to power source 14 and/or to ground 52 to facilitate disabling electric vehicle 12. In addition, method 200 may include transmitting 220, from charging device 18 to vehicle controller 34, a signal indicative of a request to disable power storage device 30.

Charging device 18 selectively delivers power to the electric vehicle 12 based on whether electric vehicle 12 is a stolen electric vehicle to reduce the risk of undesirably providing power to a stolen electric vehicle. In addition, charging device 18 notifies a law enforcement agency of the time the stolen vehicle requested power from the charging device and the location of the charging device to enable the law enforcement agency to recover the stolen vehicle. Moreover, the charging device may discharge power from power storage device 30 of electric vehicle 12 to disable electric vehicle 12, which facilitates recovery of the stolen vehicle by law enforcement agencies and reduces the cost of maintaining and/or replacing charging device 18.

The above-described systems and methods overcome at least some disadvantages of known charging devices by selectively delivering power to an electric vehicle based on a whether the electric vehicle has been reported as stolen. Moreover, the embodiments described herein include a charging device that includes an authentication device that requests a unique vehicle identifier from the electric vehicle and determines whether the electric vehicle is stolen based at least in part on the unique vehicle identifier. In addition, the charging device will notify a law enforcement agency of the time and location at which the charging device received a request to deliver power from the stolen electric vehicle to facilitate recovery of the stolen vehicle by the law enforcement agency. As such, the cost of maintaining and/or replacing the electric vehicle is reduced.

Exemplary embodiments of a charging device, a system, and a method of providing electricity to an electric vehicle are described above in detail. The charging device, system, and method are not limited to the specific embodiments described herein, but rather, components of the charging device and/or system and/or steps of the method may be utilized independently and separately from other components and/or steps described herein. For example, the charging device may also be used in combination with other power systems and methods, and is not limited to practice with only the electric vehicle as described herein. Rather, an exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of delivering power from a power supply to an electric vehicle, said method comprising:
   receiving, by a charging station from the electric vehicle, a request to deliver power from the power supply to the electric vehicle;
   receiving a signal that is indicative of a unique identifier associated with the electric vehicle;
   determining, by the charging station, whether the unique vehicle identifier is associated with a stolen electric vehicle;
   delivering power, from the charging device to the electric vehicle, after determining the unique identifier is not associated with a stolen electric vehicle; and
   discharging power from the electric vehicle to one of the power supply and to ground to facilitate disabling the electric vehicle after determining the electric vehicle to be a stolen electric vehicle.

2. A method in accordance with claim 1, further comprising:
   determining whether the unique identifier is included in a collection of unique identifiers contained in a stolen electric vehicle program; and
   determining the electric vehicle to be a stolen electric vehicle after determining the unique identifier is included in the stolen electric vehicle program.

3. A method in accordance with claim 1, further comprising:
   determining an owner account associated with the unique identifier; and
   transmitting, from the charging station to the owner, a stolen vehicle notification message after determining the electric vehicle to be a stolen electric vehicle.

4. A method in accordance with claim 3, further comprising transmitting a stolen vehicle notification signal including one of a location of the charging station and a time at which the request to deliver power was received by the charging station from the electric vehicle.

5. A method in accordance with claim 1, further comprising transmitting, from the charging station to a law enforcement agency, a stolen vehicle notification signal after determining the electric vehicle to be a stolen electric vehicle, the notification signal including one of a location of the charging station and a time at which the request to deliver power was received by the charging station from the electric vehicle.

6. A method in accordance with claim 3, wherein the stolen vehicle notification message comprises one or more of an email message and a mobile text message.

7. A method in accordance with claim 1, wherein the electric vehicle includes a control system that is configured to selectively disable the electric vehicle power storage device, said method further comprises transmitting, from the charging station to the electric vehicle control system, a signal indicative of a request to disable the power storage device upon determining the electric vehicle to be a stolen electric vehicle.

8. A charging device for use in delivering power from a power supply to an electric vehicle, said charging device comprising:
   a power delivery assembly coupled to the power supply to selectively deliver power from the power supply to the electric vehicle; and
   a controller coupled to said power delivery assembly, said controller configured to:
      receive a request to deliver power from the power supply to the electric vehicle;
      receive from the electric vehicle, a signal that is indicative of a unique identifier associated with the electric vehicle;
      determine whether the unique vehicle identifier is associated with a stolen electric vehicle;
      deliver power, from the charging device to the electric vehicle, after determining the unique identifier is not associated with a stolen electric vehicle; and
      discharge power from the electric vehicle to one of the power supply and to ground to facilitate disabling the electric vehicle after determining the electric vehicle to be a stolen electric vehicle.

9. A charging device in accordance with claim 8, wherein said controller is further configured to:
   transmit, to a vehicle registry device, a stolen vehicle verification request message including the unique vehicle identifier; and
   determine the electric vehicle to be a stolen electric vehicle upon receiving, from the vehicle registry device, an indication that the unique vehicle identifier is included in a stolen electric vehicle program.

10. A charging device in accordance with claim 9, wherein said controller is further configured to:
    transmit, to an owner registry device, an owner verification request message including the unique vehicle identifier;
    receive, from the owner registry device, a verification message including an owner of the electric vehicle; and
    transmit, to the owner, a stolen vehicle notification message after determining the electric vehicle to be a stolen electric vehicle.

11. A charging device in accordance with claim 10, wherein said controller is further configured to transmit, to the owner, a stolen vehicle notification signal including one of a location of the charging station and a time at which the request to deliver power was received by the charging station from the electric vehicle.

12. A charging device in accordance with claim 8, wherein said controller is further configured to transmit, to a law enforcement agency, a stolen vehicle notification signal after determining the electric vehicle to be a stolen electric vehicle, the notification signal including one of a location of the charging station and a time at which the request to deliver power was received by the charging station from the electric vehicle.

13. A charging device in accordance with claim 11, wherein the stolen vehicle notification signal comprises one or more of an email message and a mobile text message.

14. A charging device in accordance with claim 8, wherein the electric vehicle includes a control system that is configured to selectively disable the electric vehicle power storage device, said controller is further configured to transmit, to the electric vehicle control system, a signal indicative of a request to disable the power storage device upon determining the electric vehicle to be a stolen electric vehicle.

15. A power delivery system for use in charging an electric vehicle, said power delivery system comprising:
    a charging device configured to be electrically coupled to an electric vehicle for delivering power between a power supply and the electric vehicle, said charging device comprises a power delivery assembly coupled to the power supply to selectively deliver power from the power supply to the electric vehicle, said charging device configured to:
       receive a request to deliver power from the power supply to the electric vehicle; and receive from the electric vehicle, a signal that is indicative of a unique identifier associated with the electric vehicle; and an authentication device coupled to said charging device, said authentication device configured to:

receive, from said charging device, a stolen vehicle verification request including the unique vehicle identifier;

determine whether the unique identifier is included in a collection of unique identifiers contained in a stolen electric vehicle program; and transmit, to said charging device, a stolen vehicle verification message indicating the electric vehicle is a stolen electric vehicle upon determining the unique vehicle identifier is included in the collection of unique vehicle identifiers contained in a stolen electric vehicle program, wherein said power delivery assembly is configured to discharge power from the electric vehicle to one of the power supply and to ground to facilitate disabling the electric vehicle after said charging device receives the stolen vehicle verification message.

16. A power delivery system in accordance with claim 15, wherein the stolen electric vehicle program comprises a database.

17. A power delivery system in accordance with claim 15, further comprising:

an owner registry device including a collection of vehicle identifiers associated with a collection of owner accounts, said owner registry device configured to:

receive, from said authentication device, an owner verification request message including the unique vehicle identifier; and transmit, to said authentication device, an owner account associated with the unique vehicle identifier.

18. A power delivery system in accordance with claim 17, further comprising a notification device that is configured to transmit, to the owner, a stolen vehicle notification message after determining the electric vehicle to be a stolen electric vehicle, the stolen vehicle notification signal including one of a location of the charging station and a time at which the request to deliver power was received by the charging station from the electric vehicle.

19. A power delivery system in accordance with claim 18, wherein said notification device is further configured to transmit the notification to a law enforcement agency.

20. A power delivery system in accordance with claim 15, wherein the electric vehicle includes a control system that is configured to selectively disable the electric vehicle power storage device, said charging device is configured to transmit, to the electric vehicle control system, a signal indicative of a request to disable the power storage device upon determining the electric vehicle to be a stolen electric vehicle.

* * * * *